C. SCHWAGER.
Meat Cutting-Machines.
No. 152,768. Patented July 7, 1874.
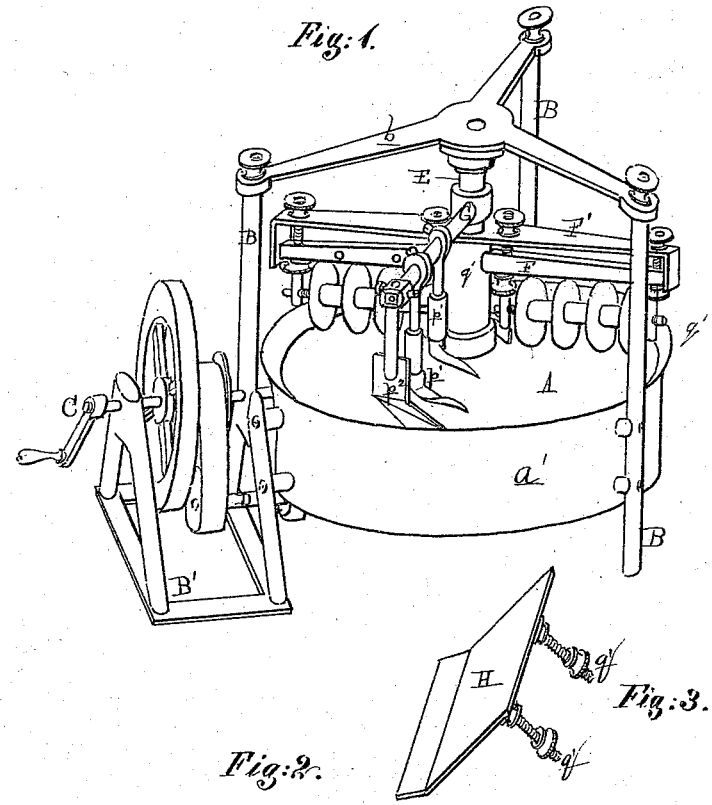
Fig. 1.
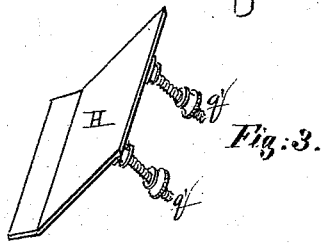
Fig. 3.
Fig. 2.
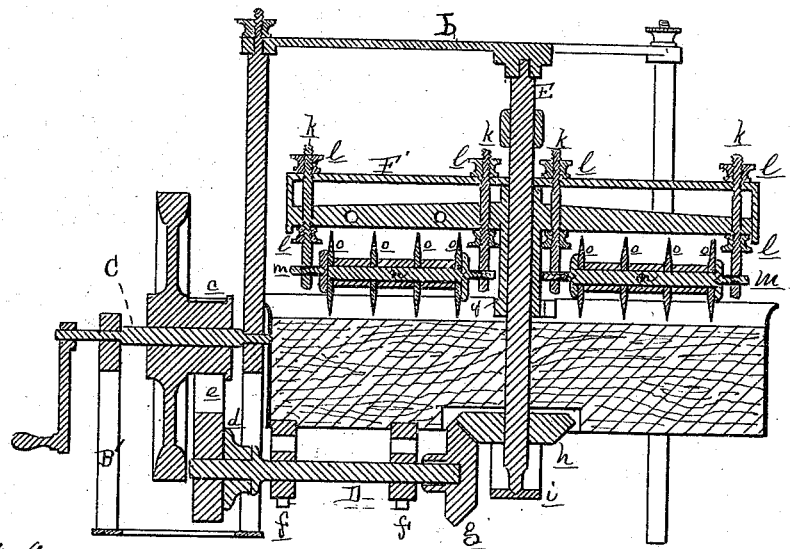
Attest.  
Inventor.  
C. Schwager  
per Attorney  
Thos. S. Sprague

UNITED STATES PATENT OFFICE.

CHARLES SCHWAGER, OF CHICAGO, ILLINOIS.

IMPROVEMENT IN MEAT-CUTTING MACHINES.

Specification forming part of Letters Patent No. 152,768, dated July 7, 1874; application filed March 24, 1874.

*To all whom it may concern:*

Be it known that I, CHARLES SCHWAGER, of Chicago, in the county of Cook and State of Illinois, have invented an Improvement in Meat-Cutting Machines, of which the following is a specification:

The nature of this invention relates to a machine for cutting or mincing sausage-meat, in which the cutting process is effected by circular knives rotating on two axes journaled under a horizontal sweep, rotating with a vertical shaft, which projects through an eye in the center of the circular wooden block.

Figure 1 is a perspective view. Fig. 2 is a transverse vertical section. Fig. 3 is a perspective view of the scraper used after cutting, for cleaning the block.

In the drawing, A represents a circular wooden block, bound within an iron hoop, $a$, and supported between the three posts B, which, with a spider, $b$, connecting them at the top, form the main frame. One of the posts has bolted to it a supplementary frame, B', in which is journaled a driving-shaft, C, provided with a hand-crank and a pulley, $c$. D is a counter-shaft journaled in hangers $f$ under the block, carrying at its outer end a pulley, $d$, driven by a belt, $e$, from the pulley $c$. At the inner end of the counter-shaft is a bevel-gear, $g$, meshing with a similar gear, $h$, on a vertical shaft, E, whose upper end is journaled in the axis of the spider, and its lower end is stepped in a stirrup, $i$, bolted to the bottom of the block. F are the arms of a sweep, whose central hub $q'$ is sleeved on and secured to the vertical shaft E above the block. The sweep is doubled by the addition of a frame-plate, F', above it, and through both are passed four bolts, $k$, one at each extremity, and one at each side of the hub $q'$, with adjusting-nuts $l$ above and below the sweep, to raise and lower the bolts as desired. Through the lower end of each bolt is tapped a screw, $m$, whose point serves as a center for a spindle, $n$, on which are sleeved a number of cutting-disks, $o$, kept apart by sleeves interposed between them.

The spindle carrying the cutting-disks $o$ may be adjusted by means of the adjusting-nuts $l$ on the bolts $k$.

In connection with the adjustment, the hub $q'$ of the arms F sleeved on the vertical shaft E also permits a vertical adjustment, in order that cutters of greater or less diameter may be used as occasion may require. G is an arm adjustably secured on the shaft E above the sweep, and on it are secured, by set-screws, the shanks of three meat-turners, $p\ p^1\ p^2$, for turning over the meat in the wake of the cutters, which rotate as they are swept around by the revolving arms, cutting the meat into strings or shreds, which are partially turned across the path of the knives, to be cut in a new direction by the knives on the other arm. The arm G is made adjustable in order to change the position of the turners $p\ p^1\ p^2$ in relation to the rotating cutters at different periods of the operation of mincing the meat, and to allow for any desired adjustment of the hub $q$ carrying the arms F F before mentioned, as well as to allow for any inequalities on the surface of the block. After the cutting process is completed and the minced meat is removed, the face of the block may be cleaned by securing a steel scraper, H, by passing its stud-bolts $q'$ (Fig. 2) through two holes made through one of the arms of the sweep for that purpose, and securing them by their nuts; a few revolutions of the sweep with this scraper attached will remove the adhering meat from the block and scrape its surface smooth and true.

What I claim as my invention, and desire to secure by Letters Patent, is—

1. The combination of the central shaft E, the adjustable hub $q'$ carrying the arms F provided with the frame-plate F' and rotating cutters $o$, and the adjustable arm G carrying the turners $p\ p^1\ p^2$, the several parts constructed and arranged substantially as described and shown.

2. The combination of the bolts $k$ with the bars F F', the centering-screws $m$, and the shafts carrying the rotating cutters, as described.

3. In combination with a central shaft, E, provided with a hub having fixed arms carrying rotating cutters, and adjustable arm G carrying turners $p\ p^1\ p^2$, the supporting-rods B and removable spider-frame $b$, constructed and arranged substantially as described and shown.

CHARLES SCHWAGER.

Witnesses:
WM. H. LOTZ,
HERMAN BISCHOFF.